(12) United States Patent
Egan et al.

(10) Patent No.: US 6,356,888 B1
(45) Date of Patent: Mar. 12, 2002

(54) UTILIZE ENCODED VECTOR INDEXES FOR DISTINCT PROCESSING

(75) Inventors: Randy L. Egan; Kevin J. Kathmann, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/361,868

(22) Filed: Jul. 27, 1999

Related U.S. Application Data

(63) Continuation-in-part of application No. 09/336,488, filed on Jun. 18, 1999.

(51) Int. Cl.$^7$ ............................................... G06F 17/30
(52) U.S. Cl. ........................ 707/2; 707/2; 707/5; 707/3
(58) Field of Search ..................................... 707/2, 3, 4

(56) References Cited

U.S. PATENT DOCUMENTS

| | | | |
|---|---|---|---|
| 5,394,143 A | * 2/1995 | Murray et al. ................ | 341/53 |
| 5,560,007 A | * 9/1996 | Thai ............................. | 707/3 |
| 5,706,495 A | 1/1998 | Chadha et al. | |
| 5,794,228 A | * 8/1998 | French et al. .................. | 707/2 |
| 5,799,184 A | * 8/1998 | Fulton et al. .................. | 707/2 |
| 5,819,256 A | * 10/1998 | Ozbutun et al. ............... | 707/2 |
| 5,822,748 A | * 10/1998 | Cohen et al. .................. | 707/2 |
| 5,852,821 A | * 12/1998 | Chen et al. .................... | 707/2 |
| 5,918,225 A | * 6/1999 | White et al. ................... | 707/3 |
| 5,937,401 A | * 8/1999 | Hillegas ........................ | 707/2 |
| 5,974,408 A | * 10/1999 | Cohen et al. .................. | 707/2 |
| 5,978,792 A | * 11/1999 | Bhargava et al. .............. | 707/2 |
| 6,285,994 B1 | * 9/2001 | Bui et al. ....................... | 707/2 |

\* cited by examiner

Primary Examiner—Hosain T. Alam
Assistant Examiner—Anh Ly
(74) Attorney, Agent, or Firm—Schmeiser, Olsen & Watts

(57) ABSTRACT

According to the present invention, an apparatus and method to significantly improve performance of the SQL DISTINCT function processing through the use of an encoded vector index (EVI) is disclosed. An EVI provides the data necessary to generate query results for SQL DISTINCT functions that specify one or more database fields upon which the EVI is built. Sequentially scanning through the EVI symbol table, each unique value or combination of values in the one or more database fields specified in the DISTINCT function are returned to provide the requested query results. By processing the EVI symbol table in lieu of more traditional database indexes, and/or in lieu of the database table itself, query results for SQL DISTINCT functions are generated significantly faster.

34 Claims, 8 Drawing Sheets

126

| EVI SYMBOL TABLE | | |
|---|---|---|
| KEY VALUE | CODE | KEY COUNT |
| MN | 0 | 7 |
| ND | 1 | 7 |
| WY | 2 | 6 |

| 230 | 240 | 127 |
|---|---|---|
| RELATIVE RECORD # (for reference) | DATABASE FIELD (for reference) | EVI VECTOR CODE |
| 1 | MN | 0 |
| 2 | ND | 1 |
| 3 | MN | 0 |
| 4 | WY | 2 |
| 5 | MN | 0 |
| 6 | WY | 2 |
| 7 | ND | 1 |
| 8 | WY | 2 |
| 9 | MN | 0 |
| 10 | WY | 2 |
| 11 | ND | 1 |
| 12 | MN | 0 |
| 13 | ND | 1 |
| 14 | WY | 2 |
| 15 | ND | 1 |
| 16 | ND | 1 |
| 17 | MN | 0 |
| 18 | ND | 1 |
| 19 | WY | 2 |
| 20 | MN | 0 |

128

126

| EVI SYMBOL TABLE | | |
|---|---|---|
| KEY VALUE | CODE | KEY COUNT |
| MN | 0 | 7 |
| ND | 1 | 7 |
| WY | 2 | 6 |

| RELATIVE RECORD # (for reference) 230 | DATABASE FIELD (for reference) 240 | EVI VECTOR CODE 127/128 |
|---|---|---|
| 1 | MN | 0 |
| 2 | ND | 1 |
| 3 | MN | 0 |
| 4 | WY | 2 |
| 5 | MN | 0 |
| 6 | WY | 2 |
| 7 | ND | 1 |
| 8 | WY | 2 |
| 9 | MN | 0 |
| 10 | WY | 2 |
| 11 | ND | 1 |
| 12 | MN | 0 |
| 13 | ND | 1 |
| 14 | WY | 2 |
| 15 | ND | 1 |
| 16 | ND | 1 |
| 17 | MN | 0 |
| 18 | ND | 1 |
| 19 | WY | 2 |
| 20 | MN | 0 |

| ROW # (for reference) | DATABASE FILE | | |
|---|---|---|---|
| | LOCATION | DEPARTMENT | BUILDING |
| 1 | MN | HNU | 15 |
| 2 | ND | HNU | 3 |
| 3 | MN | HKA | 22 |
| 4 | WY | HKA | 2 |
| 5 | MN | ABC | 8 |
| 6 | WY | ABC | 2 |
| 7 | ND | HNU | 1 |
| 8 | WY | ABC | 1 |
| 9 | MN | HKA | 15 |
| 10 | WY | HKA | 2 |
| 11 | ND | ABC | 1 |
| 12 | MN | HNU | 15 |
| 13 | ND | ABC | 1 |
| 14 | WY | HKA | 2 |
| 15 | ND | HNU | 3 |
| 16 | ND | HNU | 1 |
| 17 | MN | ABC | 8 |
| 18 | ND | HNU | 1 |
| 19 | WY | ABC | 1 |
| 20 | MN | HKA | 22 |
| 21 | MN | SSP | 10 |
| 22 | MN | ABC | 2 |
| 23 | WY | ABC | 2 |
| 24 | WY | HKA | 2 |
| 25 | MN | HNU | 15 |
| 26 | WY | HKA | 1 |
| 27 | ND | HNU | 2 |
| 28 | MN | SSP | 10 |
| 29 | MN | HKA | 22 |

FIG. 4

EVI SYMBOL TABLE

| LEADING KEY VALUE | SECONDARY KEY VALUE | CODE | KEY COUNT |
|---|---|---|---|
| MN | ABC | 0 | 3 |
| MN | HKA | 1 | 4 |
| MN | HNU | 2 | 3 |
| ND | ABC | 3 | 2 |
| ND | HNU | 4 | 6 |
| WY | ABC | 5 | 4 |
| WY | HKA | 6 | 5 |
| MN | SSP | 7 | 2 |

Rows 1–7: Sorted Range
Row 8: Overflow Range

FIG. 5

EVI SYMBOL TABLE

| LEADING KEY VALUE | SECONDARY KEY VALUE | SECONDARY KEY VALUE | CODE | KEY COUNT |
|---|---|---|---|---|
| MN | ABC | 2 | 0 | 1 |
| MN | ABC | 8 | 1 | 2 |
| MN | HKA | 15 | 2 | 1 |
| MN | HKA | 22 | 3 | 3 |
| MN | HNU | 15 | 4 | 3 |
| MN | SSP | 10 | 5 | 2 |
| ND | ABC | 1 | 6 | 2 |
| ND | HNU | 1 | 7 | 3 |
| ND | HNU | 2 | 8 | 1 |
| WY | ABC | 1 | 9 | 2 |
| WY | ABC | 2 | 10 | 2 |
| WY | HKA | 1 | 11 | 1 |
| WY | HKA | 2 | 12 | 4 |
| ND | HNU | 3 | 13 | 2 |

FIG. 7

UTILIZE ENCODED VECTOR INDEXES FOR DISTINCT PROCESSING

RELATED APPLICATION

This application is a continuation-in-part of the earlier patent application by Egan, et al entitled "UTILIZE ENCODED VECTOR INDEXING FOR DATABASE GROUPING", Ser. No. 09/336,488, filed Jun. 18, 1999, and is incorporated herein by reference.

BACKGROUND OF THE INVENTION

1. Technical Field

This invention generally relates to a database management system performed by computers, and more specifically relates to the optimization of structured query language (SQL) queries using an encoded vector index (EVI) to process a DISTINCT function.

2. Background Art

An index in a book facilitates locating information on a specific topic quickly and without blindly paging through the book. Database indexes provide similar benefits by providing a method to quickly locate data of interest. Without an index, a database performs a full table scan, blindly searching through every row in a database table until the target data is located. Thus, depending upon where data resides in a database table, such a scan can be a lengthy and inefficient process.

Indexed scans of database tables are more efficient than full table scans since the length of database index entries are in most cases shorter than the database table entries. Shorter entries mean that more index entries can be stored in a single computer page. Indexed scans can therefore result in a considerable reduction in the total number of computer pages that must be processed in order to locate the requested data.

While indexed scans of database tables can improve performance, the complexity of the data being scanned and of the nature of the database query still determine how effectively a query can be implemented. Different queries place differing levels of processing demands on the database in unique ways. As a result, different index types are needed to cope with a users' ever-changing workloads. One type of index is the encoded vector index (EVI), disclosed U.S. Pat. No. 5,706,495, Chadha et al., Jan. 6, 1998, Encoded-Vector Indices For Decision Support and Warehousing (hereinafter "Chadha"), which is incorporated by reference.

An encoded vector index (EVI) is a variation of the bitmap index concept. A bitmap index indicates whether a specific value exists for each row in a particular column. One bit represents each row. Thus, in the bitmap index for the value "MN" in the column "LOCATION," the nth bit equals 1 if the nth row of the data table contains "LOCATION"="MN," or 0 if that row holds a value other than "MN." An EVI serves a similar purpose, but only one index is necessary to account for all the values occurring in the column (whether they be "NY," "MN," or any other). So in an EVI on the "LOCATION" column, the nth position of the EVI contains a bit code that identifies the value of "LOCATION" in the nth row of the table. Thus, whereas a separate bitmap index is required to map each particular key value in a database field, only one EVI is required to represent the same information. Thus, an EVI saves computer memory by including all possible key values for a given field in one database index.

Chadha discloses a method to efficiently scan relational database information by performing bit-vector operations on EVI's, instead of performing analogous operations on the relational database table itself. However, the usage of and dependence on relational database tables has increased dramatically during the past decade, and continues to increase. Thus, new ways to use database tools, such as EVI's, are needed in order to continue to provide significant improvements in query performance; otherwise, database users will be hampered in their ability to maximize intelligent information retrieval.

DISCLOSURE OF INVENTION

According to the present invention, an apparatus and method to significantly improve performance of the SQL DISTINCT function processing through the use of an encoded vector index (EVI) is disclosed. An EVI provides the data necessary to generate query results for SQL DISTINCT functions that specify one or more database fields upon which the EVI is built. Sequentially scanning through the EVI symbol table, each unique value or combination of values in the one or more database fields specified in the DISTINCT function are returned to provide the requested query results. By processing the EVI symbol table in lieu of more traditional database indexes, and/or in lieu of the database table itself, query results for SQL DISTINCT functions are generated significantly faster.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a diagram explaining the components of an encoded vector index;

FIG. 4 is an example of selected fields from a relational database;

FIG. 5 is an example of a multiple key encoded vector index symbol table;

FIG. 7 is an example of a multiple key encoded vector index symbol table; and

MODE(S) FOR CARRYING OUT THE INVENTION

Figure 1:
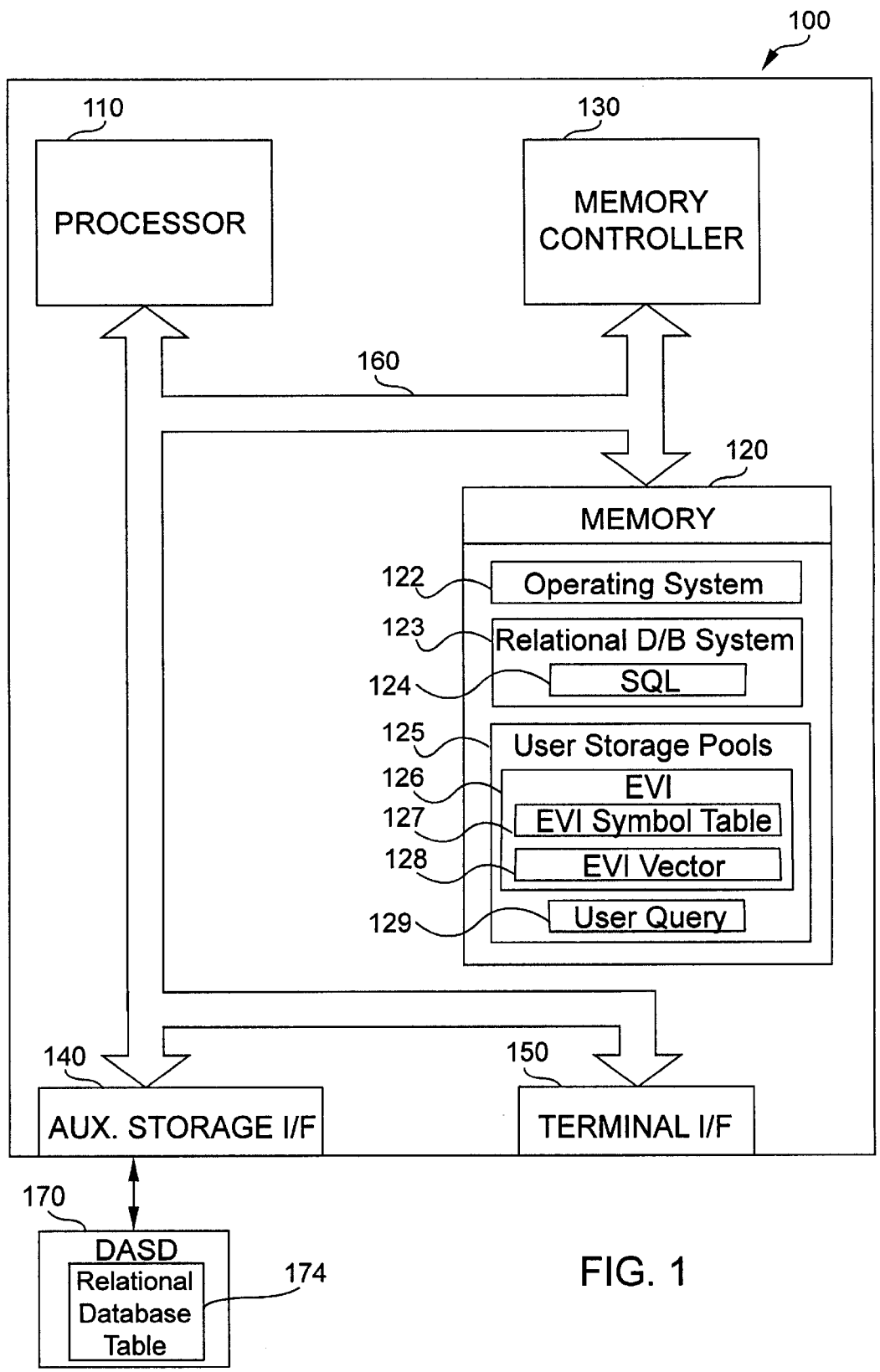
FIG. 1 is a block diagram of an apparatus according to a preferred embodiment of the present invention.

The methods of the present invention employ computer-implemented routines to query information from a database. Referring now to FIG. 1, a block diagram of a computer system which can implement a preferred embodiment of the present invention is shown. The computer system shown in FIG. 1 is an IBM AS/400; however, those skilled in the art will appreciate that the method and apparatus of the present invention apply equally to any computer system, regardless of whether the computer system is a complicated multi-user computing apparatus or a single user device such as a personal computer or workstation. Thus, computer system 100 can comprise other types of computers such as IBM compatible personal computers running OS/2 or Microsoft's Windows. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes a computer program within main memory 120.

Auxiliary storage interface 140 allows computer system 100 to store and retrieve information such as relational database table 174 from auxiliary storage devices, such as magnetic disk (e.g., hard disks or floppy diskettes) or optical storage devices (e.g. CD-ROM). As shown in FIG. 1, one suitable storage device is a direct access storage device (DASD) 170. DASD 170 may alternatively be a floppy disk drive which may read programs and data such as relational database table 174 from a floppy disk. In this application, the term "backing storage" will be used to collectively refer to all types of storage devices, including disk drives, optical drives, tape drives, etc. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., a floppy disk) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports-directional communication in a computer-related environment could be used.

In the preferred embodiment, memory 120 suitably includes an operating system 122, a relational database system 123, and user storage pools 125. Relational database system 123 includes structured query language (SQL) 124, which is an interactive query and report writing interface. Those skilled in the art will realize that SQL 124 could reside independent of relational database system 123, in a separate memory location.

User storage pools 125 include an encoded vector index (EVI) 126, and a user query 129. EVI 126 includes an EVI symbol table 127 and an EVI vector 128. EVI 126 is a database index for a relational database table, such as relational database table 174, that is stored in DASD 170. User query 129 is a request for information from relational database table 174 stored in DASD 170. The methods of the present invention do not require that the relational database table be loaded into memory 120 to obtain the information requested in user query 129. Instead, EVI 126 is loaded into memory 120 and provides relational database system 123 an efficient way to obtain the information requested by user query 129.

It should be understood that for purposes of this application, memory 120 is used in its broadest sense, and can include Dynamic Random Access Memory (DRAM), Static RAM (SRAM), flash memory, cache memory, etc. Additionally, memory 120 can comprise a portion of a disk drive used as a swap file. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

Users of relational database tables get the information they need in a useful form by creating user query 129. User query 129 is a way to ask relational database system 123 to provide only the set of information from relational database table 174 that meets certain criteria. Structured Query Language (SQL) 124 is the standard command language used to query relational databases. SQL commands are entered by a user to create user query 129, which then typically undergoes the following front-end processing by relational database system 123. User query 129 is parsed for syntax errors. The relational database table from where the user wants his information is identified. The field name(s) associated with the information are verified to exist in the relational database table. And, the SQL commands in user query 129 are reviewed by optimization software in relational database system 123 to determine the most efficient manner in which to process the user's request.

The front-end optimization processing of user query 129 by relational database system 123 determines whether a particular encoded vector index (EVI) 126 exists that might scan more efficiently than another database index or than the relational database housed in DASD 170. In order for an EVI to be useful to the methods of the present invention, the EVI must be built over the database fields specified by the DISTINCT clause in user query 129. That is, the EVI must be a database index for those particular fields in that particular database. Fields that are indexed are called EVI fields in the EVI. If an EVI with the appropriate EVI fields exists, relational database system 123 will opt to perform an indexed scan of that EVI, instead of a scan of some other traditional database index, or a scan of relational database table 174 itself.

Indexed scans of database tables are more efficient than full table scans since the index key value entries are usually shorter than the length of the database record entry. Shorter entries mean that more index entries can be stored in a single page of memory. Indexed scans can therefore result in a considerable reduction in the total number of computer pages that must be processed in order to locate the requested data.

EVI 126 is one type of database index, used to make certain types of statistical and selection queries more efficient. EVI 126 is also known as a specialized type of bitmap index. A bitmap index indicates which database rows contain a specific key value in a specific database field. The bitmap index is an array of bits, one for each row in the database table. The bit corresponding to each row is turned on or off, depending upon whether the database field contains the specific key value or not. For instance, a bitmap index may be created to indicate which rows in a database table contain a "MN" value in the "location" field. Each bit in the bitmap index that corresponds to a database row containing "MN" value in its "location" field will be turned on. The bits in the index that correspond to rows which have a location other than "MN" will be turned off. In this way, any query about the location of "MN" can be processed very efficiently.

An EVI, such as EVI 126, is structured differently than a traditional bitmap. An EVI is not limited to mapping one specific key value in a database field; instead, an EVI maps all possible key values for a given database field. The field of relational database 174 mapped by EVI 126 is called an EVI field. Sometimes, an EVI can be built over more than one database field. In this case the EVI fields include a leading EVI field, and one or more secondary EVI fields. Then, the information stored in EVI 126 is hierarchically indexed first by the leading EVI field, and further by one or more secondary key fields.

Referring now to FIG. 2, a diagram explaining the components of an encoded vector index is illustrated. In this example, EVI 126 indicates which key value exists in database field 240 for each relative database record number 230. EVI 126 is made up of two tables: EVI symbol table 127, and EVI vector 128. Only the data in EVI symbol table 127 is necessary to the methods of the present invention. The other two tables illustrated in FIG. 2, relative record number 230 and database field 240, are not components of EVI 126; instead these tables are part of the relational database table and are presented as reference information to facilitate an understanding of the structure of EVI 126.

EVI symbol table 127 has an entry for each particular key value that can be found in the database field (in this case, the LOCATION field) of the particular database for which EVI 126 is an index. Relative record number 230 and database field 240 illustrate a subset of this database. Since only three different values appear in database field 240, EVI symbol table 127 contains three rows, one for each particular key value: "MN," "ND," and "WY." EVI symbol table 127 maintains the translation from the key value to a code, as well as the count of how many records in the database table contain the key value. Using the code field, EVI symbol table 127 can be used to decode EVI vector 128. However, the code field is not used by the methods of the present invention.

Although the information stored in EVI vector 128 is not necessary for the methods of the present invention, a discussion of its contents provides a better understanding of the overall makeup of EVI 126. EVI vector 128 contains a row for every record in the database for which EVI 126 is an index. Each vector row corresponds to a database record, and contains a code for the key value contained in the EVI field. EVI vector 128 contains 20 rows, because there are 20 records in the database for which EVI 126 is an index. Each code stored in EVI vector 128 translates into the value that exists in the EVI field in the corresponding database record. The translation of the code is made possible by EVI symbol table 127. For example, for relative record number 1 in relative record number field 230, database field 240 has a "MN," which corresponds to a 0 code in EVI vector 128. By looking at EVI symbol table 127, it can be seen that code 0 equates to a key value in the EVI field of "MN."

It should be noted that EVI's are preferably built to reflect the counts of the particular key values in one or more particular database fields, as those values exist in a database at the time that the EVI is built. Those skilled in the art of databases know that in many cases, databases are frequently updated. In order for an EVI to stay current and accurately reflect a database, the EVI must be updated whenever the value of the one or more field(s) over which the EVI is built changes. The same applies when new records are added to the database and when new records are deleted.

Changes to the relational database table can affect an EVI symbol table in two ways. First, a change to the database may require a change in key count for one or more key values that exist in the EVI symbol table. An example of this first type of change is deleting a database record, or changing a database field from one key value to a second key value that also exists in the EVI symbol table. In this first type of change, the EVI symbol table is updated by updating the key count(s) to reflect the changes made to the database fields itself, without requiring a new EVI symbol table entry.

The second type of change to a database requires a new EVI symbol table entry. An example of this type of change is when a new key value is assigned to a database field, that is, a key value that does not exist in that particular database field in any other record in the database. A new key value might replace an old key value, as part of a change to an existing database record. Alternatively, a new key value might be assigned to database field when adding a new database record. Either way, the new key value will not exist in an existing EVI symbol table.

When the existing EVI was built, the EVI symbol table's EVI fields were sorted by key value. Now, in the even of a new key value in the EVI field, a new EVI symbol table entry must be created. By adding the new entry to the end of the existing EVI symbol table, the integrity of the sorted sequence of EVI symbol table entries may be affected. The EVI symbol table will then have to be rebuilt in order for all entries to be properly sorted. However, for databases that change frequently, rebuilding an EVI every time that a new EVI symbol table entry is needed can be costly and create delays in processing.

In the preferred embodiment of the present invention, the processing of EVI symbol tables accounts for the presence of unsorted EVI symbol table entries at the end of an EVI symbol table. These unsorted entries are the result of updating an EVI symbol table without rebuilding it, when changes made to the underlying database include the addition of a new key value in an EVI field. As long as the software that processes an EVI symbol table accounts for unsorted EVI symbol table entries at the end of the sorted EVI symbol table entries, the integrity of an EVI symbol table can be maintained without excessive cost and processing delay. Although no unsorted EVI symbol table entries appear in FIG. 2, unsorted EVI symbol table entries appear in forthcoming examples of the methods of the present invention.

Referring back to FIG. 1, the methods of the present invention utilize EVI symbol table 127 of EVI 126 to significantly improve the performance of user queries, such as user query 129, that contain a DISTINCT clause. The front-end processing by relational database system 123 determines if user query 129 has an SQL command with a DISTINCT clause. An EVI symbol table provides all the necessary information to generate results for the SQL with the DISTINCT clause, if the EVI symbol table has EVI field(s) that match the database field(s) specified by user query 129. Detailed examples of user query 129 that are supported by the methods of the present invention follow.

Figure 3:
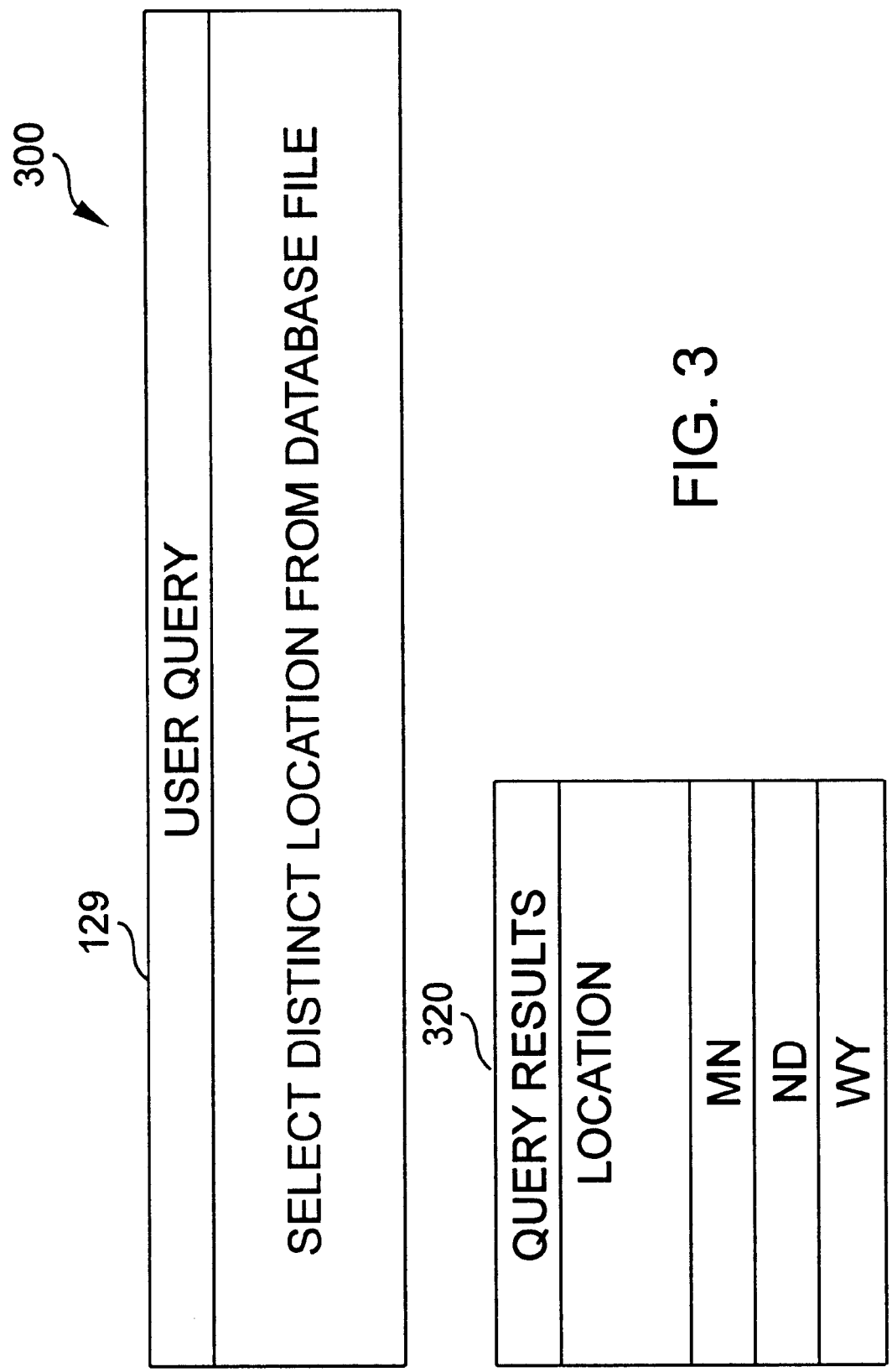
FIG. 3 is an example of an SQL command with a DISTINCT function, and corresponding query results obtained using an EVI symbol table.

Referring now to FIG. 3, an example of an SQL command with a DISTINCT function, and corresponding query results obtained using an EVI symbol table is illustrated. User query 129 in FIG. 3 requests a list of the unique values that exist in the LOCATION field of a database named DATABASE_FILE. Given that there is an EVI built on the LOCATION field of the DATABASE_FILE, the methods of the present invention can be employed by the relational database system. It should be noted that only the symbol table portion of the EVI is employed to obtain results for group queries; therefore, the EVI vector table is not shown or discussed any further in this or the forthcoming examples.

Instead of having to determine a list of unique LOCATION values using other more traditional database indexes, or the DATABASE_FILE itself, EVI symbol table 127 can be used to generate the results requested by user query 129. Determining a list of unique LOCATION values is extremely simple using EVI symbol table 127, because each EVI symbol table entry represents one of the unique LOCATION values.

Query results 320 are obtained by scanning through EVI symbol table 127 and returning the key value from each EVI symbol table entry. In this manner, the methods of the present invention generate the query results significantly faster than when traditional database indexes, or the DATABASE_FILE table itself are employed. Given that an EVI exists for the EVI field specified in the user query, results can be returned almost instantaneously compared to other methods of processing group queries, especially for large data warehousing files.

An encoded vector indexes (EVI) can be built over one database field as is the EVI represented by EVI symbol table 127 in FIG. 2, or an EVI can be built over more than one database field. Referring now to FIGS. 4 and 5, an example of selected fields from a relational database, and an example of a multiple key encoded vector index symbol table are illustrated respectively. EVI symbol table 127 is built over two of the database fields illustrated in FIG. 4: LOCATION, and DEPARTMENT. Although 29 rows exist in the DATABASE FILE relational database, EVI symbol table 127 built upon the LOCATION and DEPARTMENT fields contains only eight EVI symbol table rows. The reason is that only 8 unique value combinations of the LOCATION and DEPARTMENT fields exist in the 29 rows of DATABASE FILE.

When an EVI is built over more than one EVI field, the EVI is referred to as a multiple key EVI. In the symbol table of a multiple key EVI, such as EVI symbol table 127 in FIG. 5, the EVI fields are given specialized names to distinguish them from each other: a leading EVI field and one or more secondary key fields. In the case of EVI symbol table 127, the leading EVI field is the LOCATION field and the secondary key field is the DEPARTMENT field.

When EVI symbol table 127 is built, the EVI symbol table entries are sorted first by the leading key field, and second by the one or more secondary key fields. However, any changes made to DATABASE FILE after EVI symbol table 127 is built possibly add a new unique combination of values in the LOCATION and DEPARTMENT fields. In the case of EVI symbol table 127, it can be seen that a new combination, LOCATION=MN and DEPARTMENT=SSP was added to DATABASE FILE after EVI symbol table 127 was built. This new entry could not be added to EVI symbol table 127 in proper sort sequence without rebuilding the table. Therefore, the new entry was added at the end of EVI symbol table 127. As a result, EVI symbol table 127 contains both sorted entries and unsorted entries.

A multiple key EVI allows many more grouping query options. For instance, a multiple key EVI can be used for a simple user query like the one presented in FIG. 3. The only difference in processing a multiple key EVI is that a range of EVI symbol table entries is equivalent to one particular value in an EVI leading key field, instead of one EVI symbol table entry per particular value in an EVI field. As illustrated in FIG. 4, the first three rows and the last row of EVI symbol table 127 represent the range of EVI symbol table entries for the key value "MN." Similarly, the next two EVI symbol table entries represent the range for the key value "ND," and so on. Thus, by processing ranges of EVI symbol table entries, a simple user query can make use of multiple key EVI's.

It should be noted that with regards to the example above, any unsorted EVI symbol table entries must also be taken into account by the relational database system. Thus, when processing a range of EVI symbol table entries that equates to a particular leading key value, the unsorted EVI symbol table entries with the same particular leading key value must also be processed. This was already stated in the example of processing the range of values for the leading key value= "MN." The 3 rows in the sorted EVI symbol table entries with the leading key value="MN," as well as the unsorted entry in with a leading key value of "MN" must all be considered to correctly process EVI symbol table 127. The presence of unsorted entries complicates processing; however, the extra processing step allows the methods of the present invention to support both database tables that are warehoused and do not change, as well as database tables that change frequently.

Figure 6:
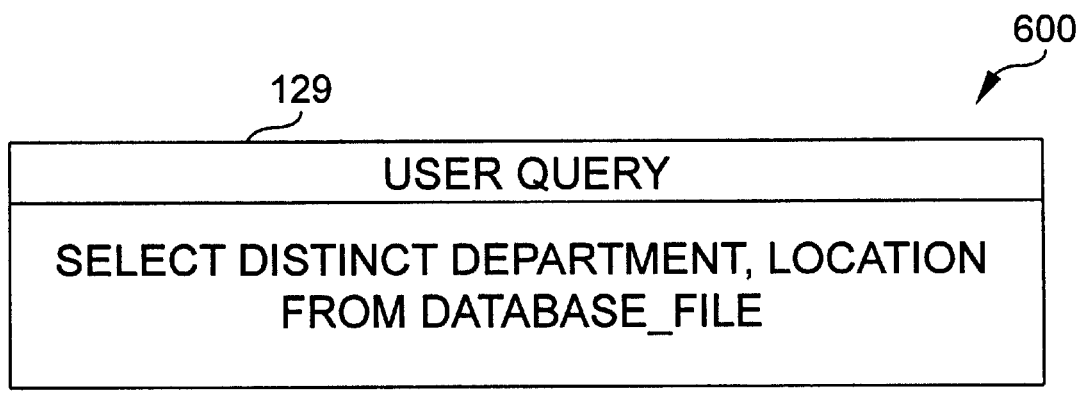
FIG. 6 is an example of an SQL command with a DISTINCT function, and corresponding query results obtained using a multiple key EVI.

Referring now to FIG. 6, an example of an SQL command with a DISTINCT function, and corresponding query results obtained using a multiple key EVI is illustrated, User query 129 is requesting all unique combinations of two database fields: DEPARTMENT and LOCATION. The relational database system identifies that this request can be processed using a multiple key EVI with an EVI symbol table such as EVI symbol table 127 in FIG. 5. Although EVI symbol table 127 is organized with a leading key field of LOCATION, and a secondary key field of DEPARTMENT, the hierarchy of EVI symbol table 127 does not matter to the methods of the present invention. As long as an EVI is indexed both on LOCATION and DEPARTMENT, query results for DISTINCT processing can be generated quickly and easily using the EVI symbol table.

Determining each unique combination of DEPARTMENT and LOCATION is as simple as merely sequentially scanning EVI symbol table 127 and returning a list of these unique combination of values. The information presented to the user will closely mimic the information in the EVI symbol table, as can be seen by comparing EVI symbol table 127 in FIG. 5, with query results 620 in FIG. 6.

Multiple key EVI's can be built using more than two database fields. Referring now to FIG. 7, an example of a multiple key encoded vector index symbol table with 3 EVI fields is illustrated. EVI symbol table 127 was built from the LOCATION, DEPARTMENT, and BUILDING fields of the DATABASE FILE, the relevant portion of which is shown in FIG. 4. Fourteen rows exist in EVI symbol table 127 because within the 29 rows of DATABASE FILE, there are 14 unique combinations of the values in the LOCATION, DEPARTMENT, and BUILDING fields.

Figure 8:
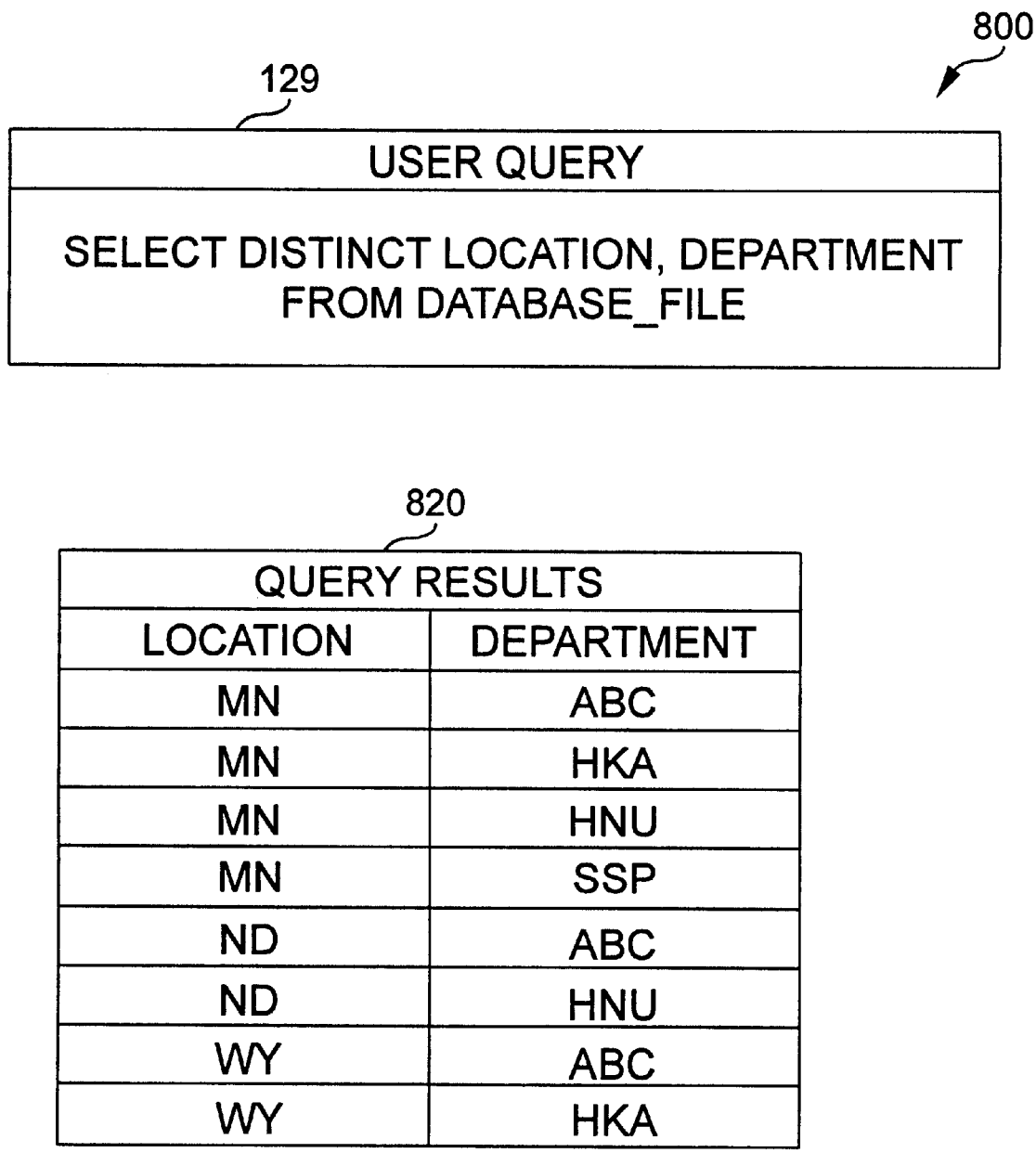
FIG. 8 is an example of an SQL command with a DISTINCT function, and corresponding query results obtained using a multiple key EVI.

Referring now to FIG. 8, an example of an SQL command with a DISTINCT function, and corresponding query results obtained using a multiple key EVI is illustrated. User query 129 is requesting all unique combinations of two database fields: LOCATION and DEPARTMENT. The relational database system identifies that this request can be processed using a multiple key EVI with an EVI symbol table such as EVI symbol table 127 in FIG. 7. EVI symbol table 127 is indexed by three EVI fields, and only two are requested by user query 129. Thus, the relational database system will determine that ranges of EVI symbol table entries will be grouped together to provide a list of all the unique combinations of LOCATION and DEPARTMENT values.

Determining each unique combination of DEPARTMENT and LOCATION is as simple as merely scanning EVI symbol table 127, combining ranges of entries, and returning a list of these unique combination of values. Because the EVI symbol table contains three EVI fields, and only two are requested by user query 129, the information presented to the user will not mimic the information in the EVI symbol table as closely as if EVI symbol table 127 was indexed on the same combination of fields requested by user query 129.

User query 129 can thus be processed without any need to process other database indices, or the relational database table itself. Again it should be noted that the relational database system will process the EVI symbol table EVI symbol table entries sequentially, first processing the sorted EVI symbol table entries, and then processing any unsorted entries that may exist at the end of the sorted entries.

The relational database system of the preferred embodiment provides efficient processing of SQL DISTINCT commands by sequentially scanning through the entries of an EVI symbol table. Query results are returned to the relational database user without the need to invoke alternate database indexes, and without the need to load the relational database table into memory and scan the relational database table itself. Since the EVI symbol table has a list of unique values for the EVI fields upon which it is indexed, the relational database system can process the information in the fields of this table much more rapidly than through the use of other database indexes. Thus, the methods of the present invention provide the relational database system with the programming to process the EVI symbol table when doing so will provide significant savings in processing time. While the invention has been particularly shown and described with reference to preferred embodiments thereof, it will be understood by those skilled in the art that various changes in form and details may be made therein without departing from the spirit and scope of the invention.

What is claimed is:

1. An apparatus comprising:
   at least one processor;
   a memory coupled to the at least one processor;
   an encoded vector index (EVI) built on at least one database field in a database, the EVI comprising a plurality of EVI symbol table entries, each EVI symbol table entry comprising a key value for each of the at least one database field; and
   a relational database system, the relational database system processing a plurality of EVI symbol table entries to generate results for a user query, the user query having a SQL command with a DISTINCT function specifying one of at least one database field on which the EVI is built.

2. The apparatus of claim 1 wherein the relational database system sequentially processes the plurality of EVI symbol table entries to generate results for the user query.

3. The apparatus of claim 1 wherein the relational database system generates results for the user query by returning the key value for each of the at least one database field from each of the plurality of EVI symbol table entries.

4. The apparatus of claim 1 wherein:
   the at least one database field comprises a leading EVI field and at least one secondary EVI field; and
   each EVI symbol table entry comprises a key value for the leading EVI field and a key value for each of the at least one secondary EVI fields.

5. The apparatus of claim 4 wherein the relational database system sequentially processes the plurality of EVI symbol table entries, and returns a plurality of leading EVI field values, each leading EVI field value from a range of EVI symbol table entries.

6. The apparatus of claim 4 wherein the relational database system sequentially processes the plurality of EVI symbol table entries, and returns at least one EVI field value for each of the plurality of EVI symbol table entries.

7. The apparatus of claim 4 wherein the relational database system sequentially processes the plurality of EVI symbol table entries, and returns a plurality of unique combinations of EVI field values.

8. An apparatus comprising:
   at least one processor;
   a memory coupled to the at least one processor;
   an encoded vector index (EVI) built on at least one database field, the EVI comprising a plurality of EVI symbol table entries, each EVI symbol table entry comprising an EVI field for each of the at least one database field, each EVI field having a key value corresponding in value to the at least one database field; and
   a relational database system, the relational database system generating results for a SQL DISTINCT function that specifies at least one database field indexed by the EVI, the relational database system generating results by sequentially processing the plurality of EVI symbol table entries and returning from each EVI symbol table entry a key value for each of the at least one database field specified by the SQL DISTINCT function.

9. The apparatus of claim 8 wherein the EVI is built on a plurality of database fields, and each EVI symbol table entry comprises a leading EVI field, and at least one secondary EVI field.

10. The apparatus of claim 9 wherein the relational database system generates results for a SQL DISTINCT function that specifies a plurality of database fields indexed by the EVI, the relational database generating results by sequentially processing the plurality of EVI symbol table entries, and returning a plurality of unique value combinations for the plurality of database fields specified in the SQL DISTINCT function.

11. The apparatus of claim 10 wherein the hierarchy of EVI fields need not match the order of the plurality of database fields specified in the SQL DISTINCT function.

12. The apparatus of claim 9 wherein the relational database system generates query results from a plurality of EVI symbol table entries that together comprise all the records in the database whose values match the key value in the at least one EVI field.

13. A method of processing an SQL DISTINCT function comprising the steps of:
   sequentially processing through a plurality of EVI symbol table entries in an EVI, the EVI indexed on a database field specified in a SQL DISTINCT function; and
   generating results for the SQL DISTINCT function by returning a list of key values, the list of key values comprising a key value from each of the plurality of EVI symbol table entries, and the list of key values comprising all unique values in the database field specified in the SQL DISTINCT function.

14. The method of claim 13 wherein the step of sequentially processing through a plurality of EVI symbol table entries comprises sequentially processing through a plurality of EVI symbol table entries in an EVI that is indexed on a plurality of database fields, one database field of which is specified in a SQL DISTINCT function.

15. The method of claim 13 wherein:
   the step of sequentially processing through a plurality of EVI symbol table entries comprises sequentially processing through a plurality of EVI symbol table entries in an EVI that is indexed on a plurality of database fields which are specified in a SQL DISTINCT function; and
   the step of generating results for the SQL DISTINCT function by returning a list of key value combinations, the list of key valu e combinations comprising a key value combination from each of the plurality of EVI symbol table entries, and the list of key value combinations comprising all unique value combinations in the plurality of database fields specified in the SQL DISTINCT function.

16. The method of claim 13 wherein:
   the step of sequentially processing through a plurality of EVI symbol table entries comprises sequentially processing through a plurality of EVI symbol table entries in an EVI that is indexed on a plurality of database fields, a subset of which are specified in a SQL DISTINCT function; and
   the step of generating results for the SQL DISTINCT function by returning a list of key value combinations, the list of key value combinations comprising a key value combination from each of the plurality of EVI symbol table entries, and the list of key value combinations comprising all unique value combinations in the subset of database fields specified in the SQL DISTINCT function.

17. A method of processing a SQL DISTINCT function comprising the steps of:
   parsing a query comprising a DISTINCT function specifying a database field;
   determining an EVI field that must exist in an EVI in order to employ the EVI to generate results for the DISTINCT function, the EVI field matching the database field;
   locating the EVI comprising a plurality of EVI symbol table entries, each EVI symbol table entry comprising a key value for the EVI field;
   sequentially processing through the plurality of EVI symbol table entries to obtain the key value in each EVI symbol table entry; and
   generating results for the DISTINCT function by generating a list of unique key values for the database field matching the EVI field.

18. The method of claim 17 wherein:
   the step of parsing a query comprises parsing a query comprising a DISTINCT function specifying a plurality of database fields;
   the step of determining an EVI field comprises determining a plurality of EVI fields that must exist in an EVI, the plurality of EVI fields matching the plurality of database fields;
   the step of locating the EVI comprises locating the EVI that comprises a plurality of EVI symbol table entries, each EVI symbol table entry comprising a plurality of key values, the plurality of key values matching the plurality of database fields;
   the step of sequentially processing through the plurality of EVI symbol table entries comprises sequentially processing through the plurality of EVI symbol table entries to obtain the plurality of key values in each EVI symbol table entry; and
   the step of generating results comprises generating a list of unique key value combinations for the plurality of database fields matching the plurality of EVI fields.

19. A program product comprising:
   an encoded vector index (EVI) built on at least one database field in a database, the EVI comprising a plurality of EVI symbol table entries, each EVI symbol table entry comprising a key value for each of the at least one database field;
   a relational database system, the relational database system processing a plurality of EVI symbol table entries to generate results for a user query, the user query having a SQL command with a DISTINCT function specifying one of at least one database field on which the EVI is built; and
   signal bearing media bearing the EVI and the relational database system.

20. The program product of claim 19 wherein the signal bearing media comprises transmission media.

21. The program product of claim 19 wherein the signal bearing media comprises recordable media.

22. The program product of claim 19 wherein the relational database system sequentially processes the plurality of EVI symbol table entries to generate results for the user query.

23. The program product of claim 19 wherein the relational database system generates results for the user query by returning the key value for each of the at least one database field from each of the plurality of EVI symbol table entries.

24. The program product of claim 19 wherein:
   the at least one database field comprises a leading EVI field and at least one secondary EVI field; and
   each EVI symbol table entry comprises a key value for the leading EVI field and a key value for each of the at least one secondary EVI fields.

25. The program product of claim 24 wherein the relational database system sequentially processes the plurality of EVI symbol table entries, and returns a plurality of leading EVI field values, each leading EVI field value from a range of EVI symbol table entries.

26. The program product of claim 24 wherein the relational database system sequentially processes the plurality of EVI symbol table entries, and returns at least one EVI field value for each of the plurality of EVI symbol table entries.

27. The program product of claim 24 wherein the relational database system sequentially processes the plurality of EVI symbol table entries, and returns a plurality of unique combinations of EVI field values.

28. A program product comprising:

an encoded vector index (EVI) built on at least one database field, the EVI comprising a plurality of EVI symbol table entries, each EVI symbol table entry comprising an EVI field for each of the at least one database field, each EVI field having a key value corresponding in value to the at least one database field;

a relational database system, the relational database system generating results for a SQL DISTINCT function that specifies at least one database field indexed by the EVI, the relational database system generating results by sequentially processing the plurality of EVI symbol table entries and returning from each EVI symbol table entry a key value for each of the at least one database field specified by the SQL DISTINCT function; and signal bearing media bearing the EVI and the relational database system.

29. The program product of claim 28 wherein the signal bearing media comprises transmission media.

30. The program product of claim 28 wherein the signal bearing media comprises recordable media.

31. The program product of claim 28 wherein the EVI is built on a plurality of database fields, and each EVI symbol table entry comprises a leading EVI field, and at least one secondary EVI field.

32. The program product of claim 31 wherein the relational database system generates results for a SQL DISTINCT function that specifies a plurality of database fields indexed by the EVI, the relational database generating results by sequentially processing the plurality of EVI symbol table entries, and returning a plurality of unique value combinations for the plurality of database fields specified in the SQL DISTINCT function.

33. The program product of claim 32 wherein the hierarchy of EVI fields need not match the order of the plurality of database fields specified in the SQL DISTINCT function.

34. The program product of claim 31 wherein the relational database system generates query results from a plurality of EVI symbol table entries that together comprise all the records in the database whose values match the key value in the at least one EVI field.

* * * * *